(12) United States Patent
An et al.

(10) Patent No.: US 12,178,348 B2
(45) Date of Patent: Dec. 31, 2024

(54) METHOD FOR ESTIMATING STATUS OF HEATED OBJECT

(71) Applicant: LG ELECTRONICS INC., Seoul (KR)

(72) Inventors: Hyo Jin An, Goyang-si (KR); Young Min Lee, Incheon (KR); Heung Sik Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/225,940

(22) Filed: Jul. 25, 2023

(65) Prior Publication Data

US 2023/0363568 A1   Nov. 16, 2023

Related U.S. Application Data

(62) Division of application No. 16/674,707, filed on Nov. 5, 2019, now Pat. No. 11,759,043.

(30) Foreign Application Priority Data

Jul. 19, 2019  (KR) .......................... 10-2019-0087796

(51) Int. Cl.
*A47J 27/21* (2006.01)
*A47J 36/32* (2006.01)
(Continued)

(52) U.S. Cl.
CPC ....... *A47J 27/21158* (2013.01); *A47J 36/321* (2018.08); *F24C 7/087* (2013.01);
(Continued)

(58) Field of Classification Search
CPC ... A47J 27/21158; A47J 36/321; F24C 7/087; F24C 15/105; G01G 19/00; G01G 19/52;
(Continued)

(56) References Cited

U.S. PATENT DOCUMENTS 3,894,591 A    7/1975   Ackeret
4,126,778 A    11/1978  Cole
(Continued)

FOREIGN PATENT DOCUMENTS

CN    106688307 A    5/2017
CN    208652643 U    3/2019
(Continued)

OTHER PUBLICATIONS

Computer translation of KR 101 659 017 downloaded from the Korean Patent Office website on May 17, 2024.*
(Continued)

*Primary Examiner* — Randy W Gibson
(74) *Attorney, Agent, or Firm* — Birch, Stewart, Kolasch & Birch, LLP

(57) ABSTRACT

The present disclosure relates to an apparatus and a method for estimating a state of an object to be heated based on sound which is generated when the object to be heated is heated, and providing the estimated information to other devices in an Internet of Things (IoT) environment through a 5G communication network. The heating apparatus may include a housing having a receiving space therein, a heating member disposed within the housing, a power supplier for supplying power to the heating member, a top plate disposed on the top of the housing to support the object to be heated, a sound sensor disposed on the bottom of the top plate, and a controller for predicting the state of the object to be heated by using a deep neural network model that has been trained through machine learning based on a sound signal received from the sound sensor.

8 Claims, 9 Drawing Sheets

(51) Int. Cl.
*F24C 7/08* (2006.01)
*F24C 15/10* (2006.01)
*G01G 19/00* (2006.01)
*G01G 19/52* (2006.01)
*G01H 9/00* (2006.01)
*G01H 17/00* (2006.01)
*G01G 23/06* (2006.01)

(52) U.S. Cl.
CPC ............ *F24C 15/105* (2013.01); *G01G 19/00* (2013.01); *G01G 19/52* (2013.01); *G01H 9/008* (2013.01); *G01G 23/06* (2013.01); *G01H 17/00* (2013.01)

(58) Field of Classification Search
CPC ........ G01G 23/06; G01H 9/008; G01H 17/00; H05B 1/0269; H05B 6/062; H05B 2213/07; H05B 6/12
See application file for complete search history.

(56) References Cited

U.S. PATENT DOCUMENTS

| | | | |
|---|---|---|---|
| 4,378,412 A | | 3/1983 | Snyders |
| 4,553,619 A | * | 11/1985 | Fujinaga ............ G01G 23/3707 708/445 |
| 2017/0245327 A1 | * | 8/2017 | Viroli ................. G05D 23/1919 |
| 2018/0306609 A1 | | 10/2018 | Agarwal et al. |
| 2019/0125120 A1 | | 5/2019 | Jenkins et al. |
| 2020/0000130 A1 | | 1/2020 | Roeckl |
| 2021/0161329 A1 | | 6/2021 | Kim |
| 2021/0185772 A1 | * | 6/2021 | Kim ....................... H05B 6/062 |
| 2021/0209465 A1 | | 7/2021 | Maeng |
| 2023/0094391 A1 | * | 3/2023 | Viroli ................... H05B 6/1209 219/622 |

FOREIGN PATENT DOCUMENTS

| | | | | |
|---|---|---|---|---|
| DE | 2 142 692 A1 | | 3/1973 | |
| DE | 31 46 638 A1 | | 7/1983 | |
| DE | 10 2015 109 053 A1 | | 12/2016 | |
| DE | 10 2018 203 229 A1 | | 10/2018 | |
| EP | 3152497 B1 | | 2/2019 | |
| JP | 2005-129239 A | | 5/2005 | |
| JP | 2005-135588 | * | 5/2005 | ............... H05B 6/12 |
| JP | 2011-247526 | * | 12/2011 | ............... H05B 6/12 |
| KR | 10-2009-0122697 A | | 12/2009 | |
| KR | 10-1390397 B1 | | 4/2014 | |
| KR | 10-1659017 B1 | | 9/2016 | |
| KR | 10-1723601 B1 | | 4/2017 | |
| KR | 10-1849099 B1 | | 4/2018 | |
| KR | 10-2019-0010208 A | | 1/2019 | |
| KR | 10-2435186 B1 | | 8/2022 | |
| WO | WO 2015/185211 A2 | | 12/2015 | |
| WO | WO 2018/224332 A1 | | 12/2018 | |

OTHER PUBLICATIONS

Computer translation of DE 2 142 692 downloaded from the European Patent Office website on May 17, 2024.*
Computer translation of 2011-247526 downloaded from the Japanese Patent Office website on May 17, 2024.*
Computer translation of 2005-135588 downloaded from the Japanese Patent Office website on May 17, 2024.*
Computer translation of KR 101 659 017 downloaded from the Korean Patent Office on Jul. 27, 2022.

* cited by examiner

METHOD FOR ESTIMATING STATUS OF HEATED OBJECT

CROSS-REFERENCE TO RELATED APPLICATIONS

This application is a Divisional of U.S. application Ser. No. 16/674,707, filed on Nov. 5, 2019, which claims priority under 35 U.S.C. § 119(a) to Korean Application No. 10-2019-0087796 filed in the Republic of Korea on Jul. 19, 2019, the contents of which are incorporated by reference herein in their entirety.

BACKGROUND OF THE INVENTION

Field of the Invention

The present disclosure relates to a heating apparatus and method for estimating a state of an object to be heated. More particularly, the present disclosure relates to an apparatus and a method for estimating a state of an object to be heated based on sound which is generated when the object to be heated is heated.

Discussion of the Related Art

When food is heated for purposes such as cooking, if heating continues without continuous monitoring, the food may be overheated and thus evaporate, and in a serious case, a fire may be caused. Accordingly, technical attempts have been made to sense when the temperature rises excessively, and to automatically control or stop operation of a heater in such instance.

In Korean Patent Registration No. 1390397, entitled "Apparatus and method for controlling safety cooking appliance," a method for reducing the amount of heating when food boils over by installing a CCD camera on a main body of the heater to photograph an image of the food to be cooked, and analyzing the photographed image, is described. In order to implement the technology disclosed in the above-described document, installation of a separate CCD camera so that the heater may be viewed from the top is necessary, and there is a limitation in that considerable processing resources are required to analyze the photographed image.

In Korean Patent Registration No. 1723601, entitled "An apparatus and method to predict and detect a fire on cooking ranges" described is a method for warning a user when a warning time is reached by calculating a warning time based on a temperature variation pattern according to a temperature sensing value received through a remote temperature sensor for sensing the temperature of a cooking container. In order to implement the technology disclosed in the above-described document, the remote temperature sensor for sensing the temperature of the cooking container should be newly added, separately from the heater, and there is a limitation in that estimation may be inaccurate since the warning time is calculated based on the temperature variation pattern based on the temperature of the cooking container rather than the contents in the cooking container.

In Korean Patent Registration No. 1849099, entitled "Boil and boil dry detection apparatus," described is a method for determining that water is boiling by determining vibration of a cooking container using an ultrasonic wave transmitting apparatus for transmitting a transmission ultrasonic wave signal toward the cooking container placed on a cooking device, and an ultrasonic wave receiving apparatus for receiving a reflection ultrasonic wave signal reflected and returned from the cooking container. In order to implement the technology disclosed in the above-described document, an ultrasonic wave transmitting apparatus and an ultrasonic wave receiving apparatus should be additionally provided, separately from the heater, and there is a limitation in that the accuracy of estimation may be lowered since the frequency of vibration is different for every different container.

In order to overcome the above-described limitations, there is a need to provide a more advanced solution regarding a method for sensing the heating situation in the process of heating an object, such as when cooking, and automatically controlling the heating operation.

SUMMARY OF THE INVENTION

Accordingly, one aspect of the present invention is to solve the above-noted and other problems in which, in addition to a heater, components such as a camera, an ultrasonic apparatus, and a remote temperature sensor apparatus should be additionally installed in order to monitor the process of heating an object so as to prevent excessive heating.

Another aspect is to address a shortcoming in which the accuracy of determination is lowered unless an additional apparatus is used in addition to a heater in determining whether the contents of a container heated by the heater are boiling.

Still another aspect is to address a shortcoming in which an additional apparatus for directly measuring the temperature of an object to be heated should be used in addition to the heating apparatus so that the cooking of the object to be heated is performed for a specific time within a certain temperature range.

Accordingly, one object of the present invention is to provide a heating apparatus for estimating a state of an object to be heated by sensing a sound which is generated when the object to be heated boils.

Embodiments of the present disclosure provide a heating apparatus and a method capable of estimating the state of an object to be heated even without separately adding, in addition to the heater, components such as a camera, an ultrasonic apparatus, and a remote temperature sensor apparatus, unlike the related art. Further, the embodiments of the present disclosure provide a heating apparatus and a method capable of accurately determining whether the object to be heated is boiling even without using an additional apparatus in addition to the heating apparatus.

In addition, the embodiments of the present disclosure provide a method for disposing a sound sensor by which sound which is generated during heating of the object to be heated can be reliably collected. Further, the embodiments of the present disclosure provide a method for maintaining a boiling state only for the time desired by the user after the object to be heated has reached the boiling state, thereby implementing safe and effective cooking.

Also, the embodiments of the present disclosure provide a heating apparatus and method capable of preventing the object to be heated from boiling over by adjusting the magnitude of heat energy provided through the heating apparatus after the object to be heated has reached the boiling state, thereby providing convenience and stability to the user.

The effects of the present disclosure are not limited to the above-described effects, and other effects not described may be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION OF THE EMBODIMENTS

Figure 1:
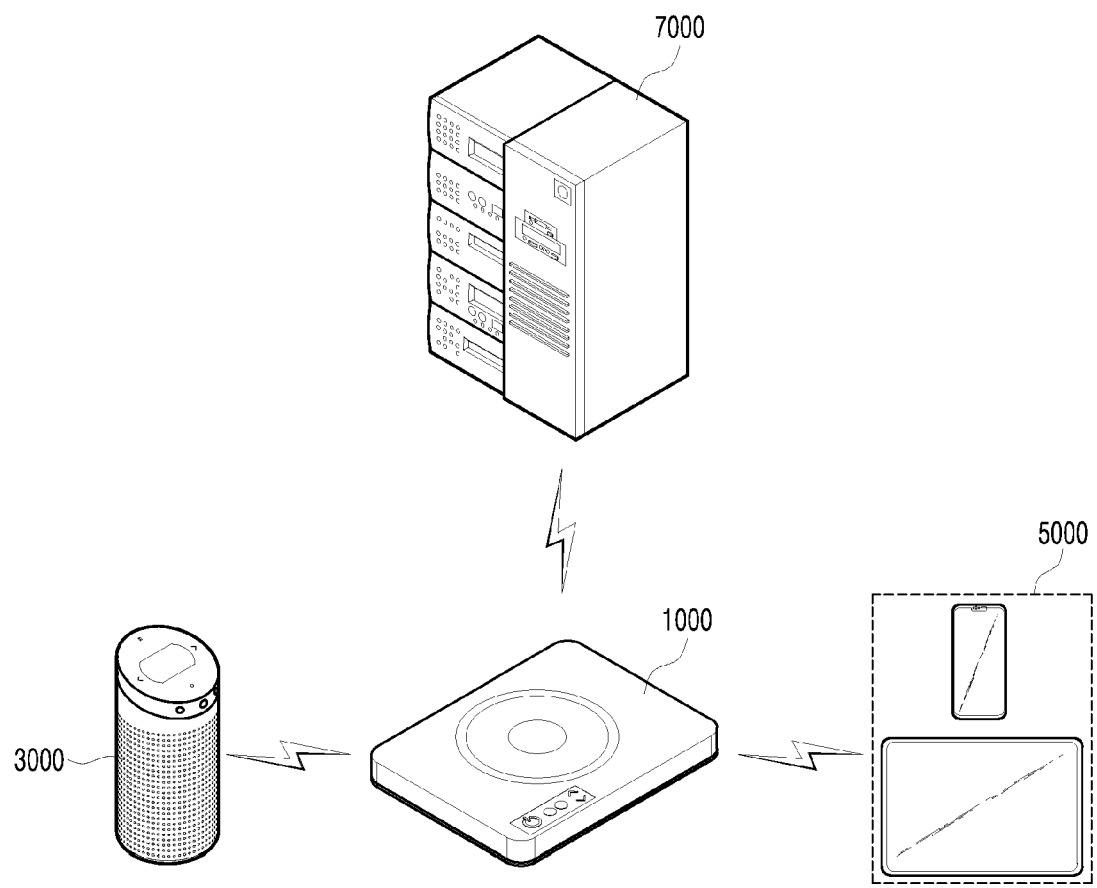
FIG. 1 is a diagram illustrating the environment in which a heating apparatus for estimating a state of an object to be heated according to an embodiment of the present disclosure operates.

Advantages and features of the present disclosure and methods of achieving the advantages and features will be more apparent with reference to the following detailed description of example embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, the terms such as "first," "second," and other numerical terms may be used herein only to describe various elements, but these elements should not be limited by these terms. Furthermore, these terms such as "first," "second," and other numerical terms, are used only to distinguish one element from another element.

Hereinafter, embodiments of the present disclosure will be described in detail with reference to the accompanying drawings. Like reference numerals designate like elements throughout the specification, and overlapping descriptions of the elements will not be provided.

FIG. 1 is a diagram illustrating the environment in which a heating apparatus for estimating a state of an object to be heated according to an embodiment of the present disclosure operates. Although a heating apparatus of the present disclosure includes various devices having heating mechanisms, the heating apparatus will be described below as an electric range as an example, for convenience of explanation.

As shown, an electric range 1000 can operate in an Internet of Things (IoT) environment constructed by using a 5G communication network. The electric range 1000 can communicate with an artificial intelligence speaker 3000, a user terminal 5000, and an external server 7000. Further, the user terminal 5000 can receive a certain command from the user and transfer the command to the electric range 1000, and receive operation information of the electric range 1000 and transfer the operation information to the user.

The user terminal may include a communication terminal capable of performing the function of a computing apparatus, and may be a desktop computer, a smart phone, a notebook, a tablet PC, a smart TV, a portable phone, a personal digital assistant (PDA), a laptop, a media player, a micro server, a global positioning system (GPS) apparatus, an electronic book terminal, a digital broadcast terminal, a navigation, a kiosk, a MP3 player, a digital camera, a consumer electronic, and other mobile or non-mobile computing apparatuses, which are operated by the user, but is not limited thereto. Further, the user terminal may be a wearable terminal such as a watch, eyeglasses, a hair band, and a ring, having a communication function and a data processing function. Such a user terminal is not limited to the above terminals, and the terminals capable of voice recognition may be borrowed without limitation.

The artificial intelligence speaker 3000 can also receive a certain command from the user through voice and transfer the command to the electric range 1000, and also receive operation information of the electric range 1000 and transfer the operation information to the user by voice. The external server 7000 can also receive and store the operation information of the electric range 1000, and also provide a reference for the electric range 1000 to perform determination through an accumulated database.

For example, the external server 7000 may have an object-to-be-heated sound database in which, for each type of object to be heated, information about the sound generated while the object is heated is stored in association with the temperature of the object. The electric range 1000 can collect the sound which is generated while heating the object, and estimate the state of the object by referring to the object-to-be-heated sound database through communication with the external server 7000.

As another example, the external server 7000 may have an object-to-be-heated sound deep neural network model that has been trained in advance to estimate the state of the object to be heated based on the sound signal which is generated as the object is heated. In this instance, the electric range 1000 can collect the sound which is generated while heating the object, and also estimate the state of the object to be heated by using the object-to-be-heated sound deep neural network model through communication with the external server 7000.

As still another example, the external server 7000 can update the object-to-be-heated sound database and the object-to-be-heated sound deep neural network model by communicating with various electric ranges and collecting information. The external server 7000 can also transmit the updated database and deep neural network model to the electric range 1000 so that the electric range 1000 itself estimates the state of the object to be heated based on the sound signal which is generated as the object is heated.

In addition, the electric range 1000 can be connected to the above-described devices through a network, and the network can serve to connect the electric range 1000 with the user terminal 5000, the artificial intelligence speaker 3000, and the external server 7000. Such a network may be a wired network such as a local area network (LAN), a wide area network (WANs), a metropolitan area network (MAN), and an integrated service digital networks (ISDN), or a wireless network such as a wireless LAN, CDMA, Bluetooth, and satellite communication, but the scope of the present disclosure is not limited thereto.

Further, the network can transmit and receive information by using short distance communication and/or long distance communication. Here, the short distance communication may include Bluetooth®, radio frequency identification (RFID), Infrared Data Association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network may include connections of network elements such as hubs, bridges, routers, switches, and gateways. The network may also include one or more connected networks, including a public network such as the Internet and a private network such as a secure corporate private network. For example, the network may include a multi-network environment. Access to the network may be provided through one or more wired or wireless access networks.

Figure 2:
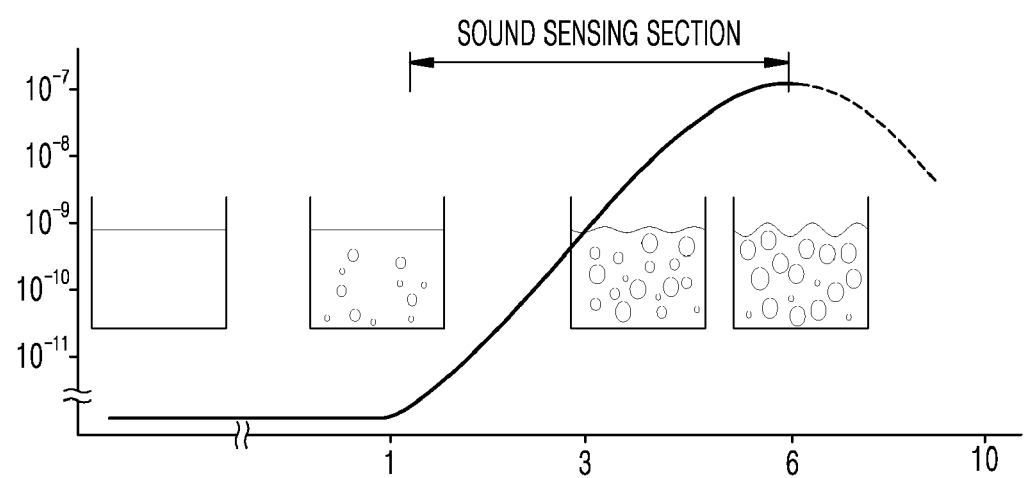
FIG. 2 is a diagram illustrating sound generated while the object to be heated is heated by the heating apparatus according to an embodiment of the present disclosure.

Next, FIG. 2 is a diagram illustrating sound generated while the object is heated by a heating apparatus according to an embodiment of the present disclosure. Although the object to be heated may include various types of contents contained in the container, the object to be heated will be described below as a liquid contained in a pot as an example.

As shown in FIG. 2, as the liquid in the pot is heated, bubbles are generated in the liquid and the bubbles rise to the surface of the liquid, such that sound is generated from the pot or between the pot and the top plate of the electric range 1000. In the graph of FIG. 2, the x-axis represents time and the y-axis represents the magnitude of the sound. At the initial stage of heating, only the temperature of the liquid in the pot rises, and no bubbles are generated. Accordingly, no sound is sensed.

However, as the heating time passes, the number of bubbles generated in the liquid contained in the pot increases, and the magnitude of the sound generated thereby increases. Accordingly, based on the magnitude of the sound, it is possible to determine whether the object to be heated is boiling, and also to estimate the temperature and degree of boiling of the object to be heated.

Based on this phenomenon, an apparatus capable of directly measuring the temperature of the contents of the pot and a microphone capable of collecting sound generated from the pot on the top plate of the electric range can be installed, and then the temperature of the contents and the sound generated at the corresponding temperature can be recorded while changing, for example, the type, weight, and size of the pot, and the type, weight, and size of the contents contained in the pot.

The recorded data is sound data for which a corresponding temperature is labeled. A matching table capable of estimating the temperature of the contents according to the sound generated from the pot on the top plate of the electric range can be made by using the labeled data. In addition, the deep neural network model capable of estimating the temperature of the contents according to the sound generated from the pot on the top plate of the electric range can learn and be trained with this labeled data.

Further, the database or the deep neural network model generated through this preliminary work can be embedded in a memory of the electric range 1000, or stored in the external server 7000 with which the electric range 1000 communicates, and be used to estimate the state of the object to be heated according to a sound signal received from a sound sensor (e.g., vibration sensor) of the electric range 1000 during actual use.

Figure 3:
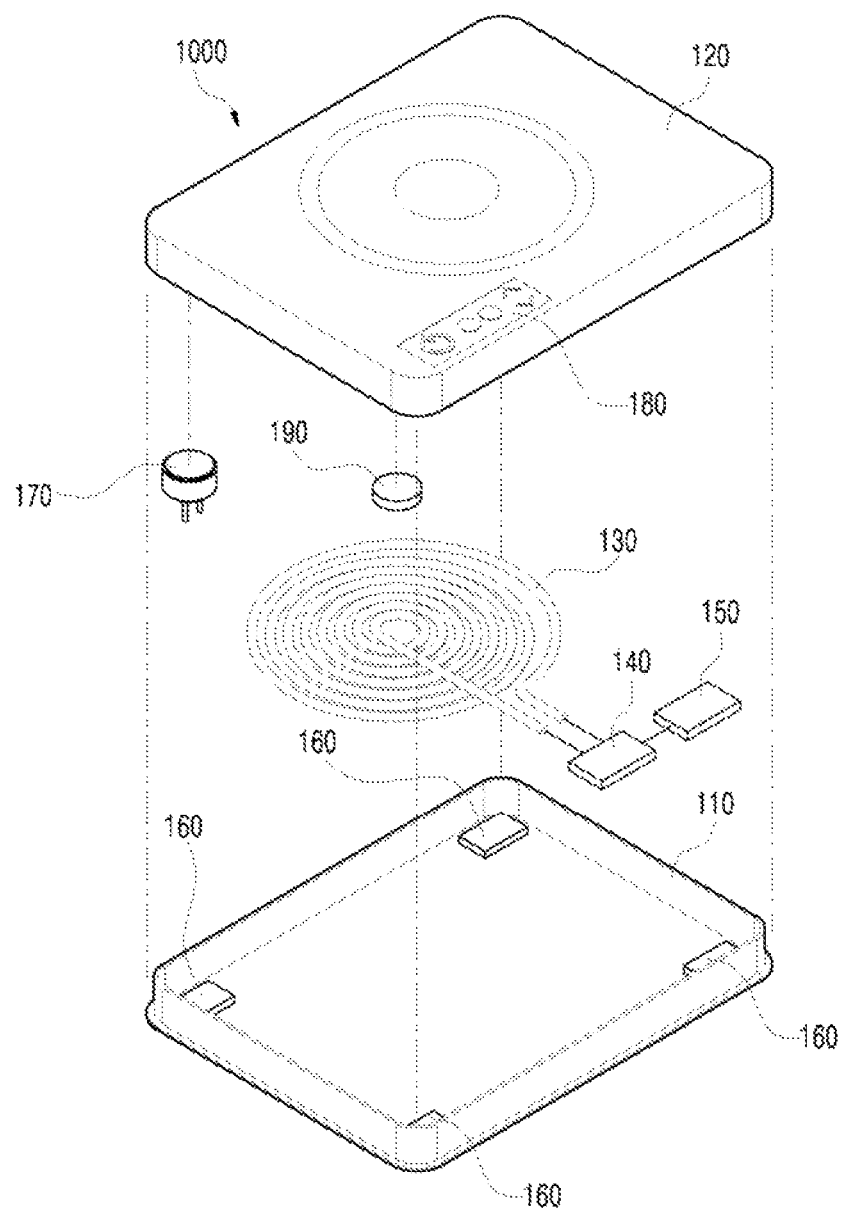
FIG. 3 is an exploded view of the heating apparatus according to an embodiment of the present disclosure.

Next, FIG. 3 shows an exploded view of the heating apparatus according to an embodiment of the present disclosure. The electric range 1000 for estimating the state of the object to be heated according to an embodiment of the present disclosure may include a housing 110 having a receiving space therein, a heating member 130 disposed in the housing 110, a power supplier 140 for supplying power to the heating member, a power management part 150 for managing the power supplier 140, a top plate 120 disposed on the top of the housing 110 to support the object to be heated, a sound sensor 170 (e.g., vibration sensor) disposed under the top plate 120, and an interface 180 for receiving an instruction from the user. The sound sensor 170 may or may not contact the top plate 120.

Further, the electric range 1000 may include additional sensors capable of sensing the operation situation of the electric range 1000 such as a temperature sensor 190 disposed on the bottom of the top plate 120 to sense a temperature, and a weight sensor 160 disposed within the housing to measure the weight of the object to be heated disposed on the top plate 120.

In addition, the electric range 1000 can include a controller for controlling power supply of the power supplier 140 to the heating member 130 by controlling the power management part 150 based on the sound signal received from the sound sensor 170. The controller can also stop the power supply from the power supplier 140 to the heating member 130 when it is determined, based on the sound signal received from the sound sensor 170, that the object to be heated is boiling and may boil over due to an excessive degree of boiling.

Alternatively, upon receiving a signal according to which the object to be heated is to be continuously boiled for a certain duration, from the interface 180, the artificial intelligence speaker 3000, or the user terminal 5000, the controller can also increase the power supply of the power supplier 140 when the sound signal is reduced to a threshold or less.

As shown in FIG. 3, the sound sensor 170 can also be disposed just outside a coil that is the heating member 130, and if a hollow is formed in the coil, the sound sensor 170 can be disposed to contact the bottom surface of the top plate 120 at the position where the hollow is formed.

The sound sensor 170 can also be disposed to closely contact the bottom surface of the top plate 120 in order to closely sense the sound from the object to be heated that is supported by the top plate 120, but may also be disposed to have a slight distance from the bottom surface of the top plate 120 according to the sensitivity of the sound sensor 170. Further, the sound sensor 170 may be an Electrets Condenser Microphone (ECM) capable of converting the sound to be collected into an electric signal, and further, various types of microphones may be used.

Figure 4:
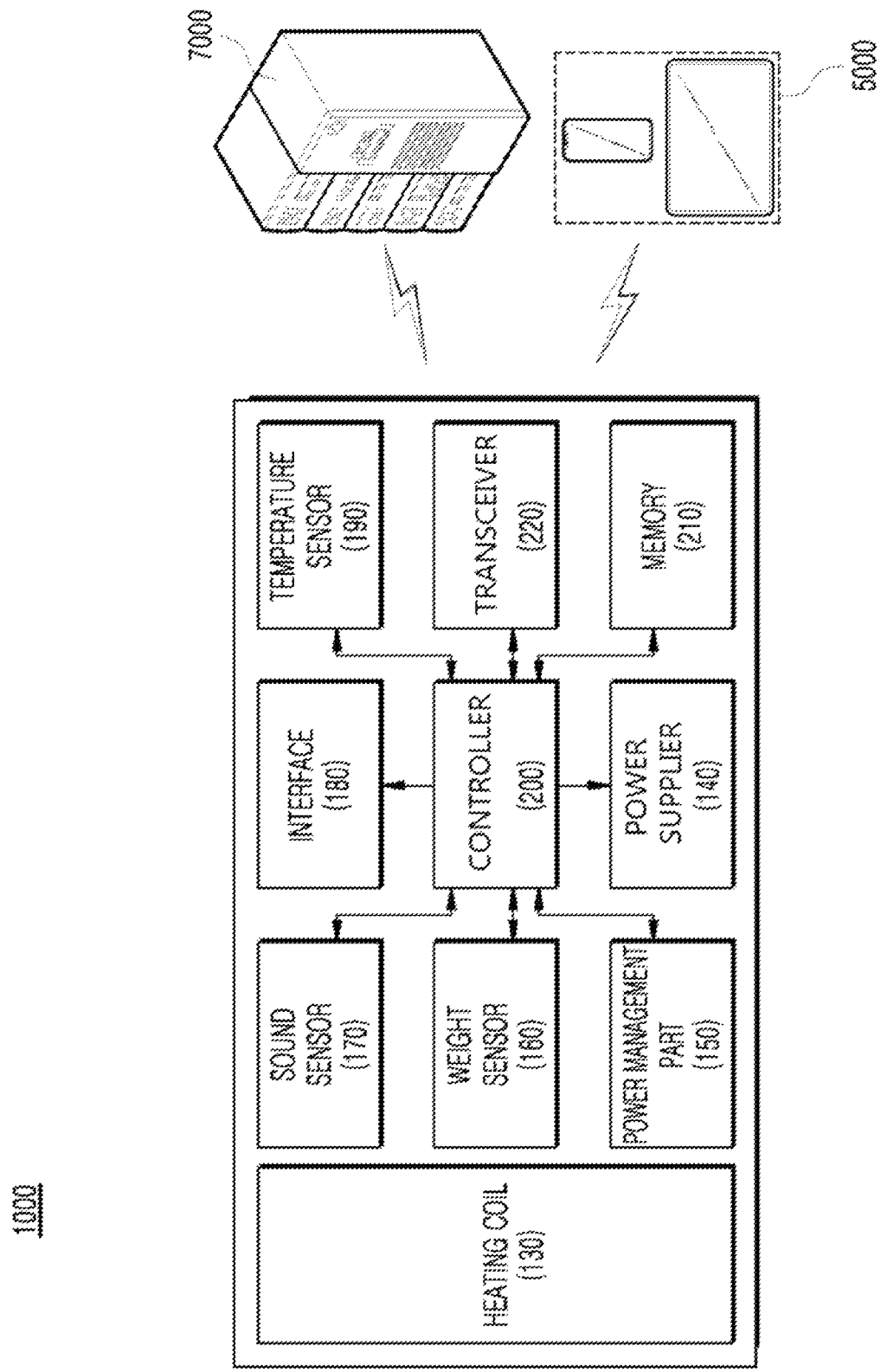
FIG. 4 is a block diagram of the heating apparatus according to an embodiment of the present disclosure.

Next, FIG. 4 is a block diagram of the heating apparatus according to an embodiment of the present disclosure. The heating apparatus according to an embodiment of the present disclosure may be represented by the block diagram as in FIG. 4, and as shown in FIG. 4, a controller 200 can control the operation of various components in the electric range 1000.

When the sound sensor 170 collects the sound generated between the pot and the top plate while the pot vibrates as the object to be heated is heated, the controller 200 of the object to be heated can control the amount of power supplied by the power supplier 140 according to the collected sound signal.

When the sound signal indicates the object is boiling strongly and is likely to boil over, the controller 200 can cause the power supplier 140 to temporarily stop the power supply. In another example, upon receiving a signal according to which the object to be heated is to be continuously boiled during a certain duration, from the interface 180, the artificial intelligence speaker 3000, or the user terminal 5000, the controller 200 can also increase the power supply of the power supplier 140 when the sound signal is reduced to a threshold or less.

In addition, the electric range 1000 may include the weight sensor 160 in addition to the sound sensor 170. In particular, the weight sensor 160 can acquire weight information of the object to be heated that is supported by the top plate 120 of the electric range 1000.

According to the weight of the object to be heated, a different sound or vibration may be generated even at the same degree of boiling of the object to be heated. Accordingly, the controller can also consider the weight signal received from the weight sensor 160 in addition to the sound signal received from the sound sensor 170 in determining the state of the object to be heated.

Further, the weight sensor 160 can be used to determine additional characteristics of the object to be heated. For example, the controller can use the sensed weight of ingredients added to the object to heated (e.g., water, a sauce, a pre-mixture, etc.) and control the power accordingly.

In one embodiment, if no additional weight change is sensed after a predetermined time period, the controller can reduce power supplied to the heating member. That is, no additional weight change after a predetermined time period can be determined as the user is finished adding ingredients, and the boiling time period has been completed. Thus, the controller can reduce the power and save wasted cooking resources.

In another embodiment, if an increased weight change is sensed during the predetermined time period, the controller can maintain the power supplied to the heating member. That is, an increased weight during the predetermined time period can be determined as the user is still adding ingredients (and thus not finished adding ingredients). Thus, the controller can efficiently maintain the power. In still another embodiment, if an increased weight change is sensed during the predetermined time period, the controller can increase the power supplied to the heating member. That is, the increased weight indicates additional ingredients have been added, which is likely to reduce the boiling of the ingredients for a short period of time until full boiling is resumed. Thus, in this example, the controller can increase the power supplied to the heating member, so quickly achieve the previous boiling state.

In another embodiment, if a reduced weight change is sensed after the predetermined time period, the controller can reduce the power supplied to the heater member including turning off the power and also stop detecting the vibration signal. That is, a reduction in weight after the predetermined time period can be determined as the user has removed ingredients (e.g., removing noodles from boiling water), and thus advantageously reduce/turn off the power because the user has completed cooking the ingredients. This advantageously save wasted cooking resources.

In yet another embodiment, if a reduced weight between a first weight and a second weight is sensed, the controller can reduce the power supplied to the heating member by a first amount, and if a reduced weight between the second weight and a third weight is then sensed, the controller can reduce the power by a second amount. That is, the reduction of weight from a first weight to a second weight can be determined as removing a first ingredient, and the reduction of weight from the second weight to a third weight can be determined as removing a second ingredient. Thus, the controller can advantageously reduce the power supplied to the heating member by a first amount when the first ingredient is removed, and by a second amount when the second ingredient is removed. This advantageously saves wasted cooking resources.

In still another embodiment, if an increased weight is sensed between a first weight and a second weight, the controller can increase the power to the heating member to maintain the boiling state. That is, this can be determined as adding an ingredient which reduces the boiling state, so the controller can advantageously increase the power to accommodate the addition ingredient.

Further, using the first and second weights, the controller can advantageously increase the power by predetermined increments. For example, for a small weight change between the first and second weights, the controller can increase the power by a small value corresponding the small weight change. For a large weight change between the first and second weights, the controller can increase the power by a large value corresponding the large weight change. A table can be stored in the memory indicating power increase values corresponding one-to-one to incremental weight changes. A similar approach can be used when decreasing the power to correspond with small or large reductions in weight.

Further, the electric range 1000 may include the temperature sensor 190 in addition to the sound sensor 170. In particular, the temperature sensor 190 can be disposed to contact the bottom surface of the top plate 120 to sense the temperature of the top plate 120.

The temperature sensor 190 can be used to determine the authenticity of the sound signal received from the sound sensor 170, and whether there is an error in the sound signal. For example, when a sound signal, which is generated when the object to be heated boils, is received from the sound sensor 170 but the temperature of the top plate 120 sensed from the temperature sensor 190 is lower than a certain temperature, the source of the signal sensed by the sound sensor 170 may be another sound rather than the sound generated by the boiling of the object to be heated. Accordingly, the controller 200 can be configured to ignore the sound signal received from the sound sensor 170 when the temperature of the top plate 120 sensed from the temperature sensor 190 is lower than a certain temperature (for example, 70° C.).

Further, the electric range 1000 may include a memory 210. In particular, the memory 210 can store the database or the deep neural network model generated through the above-described preliminary work, and the controller 200 can estimate the state of the object to be heated according to the sound signal received from the sound sensor 170 during the use of the electric range 1000 by using the database and the deep neural network model.

Further, the electric range 1000 may include a transceiver 220. Thus, the electric range 1000 can communicate with the user terminal 5000 or the external server 7000 through the transceiver 220.

The external server 7000 can also receive and store the operation information of the electric range 1000, and provide a reference for the electric range 1000 to perform the determination through the accumulated database. For example, the external server 7000 can have the object-to-be-heated sound database in which, for each type of object to be heated, information about the sound generated while the object to be heated is heated is stored in association with the temperature of the object to be heated, and the electric range 1000 can collect sound which is generated while heating the object to be heated, and estimate the state of the object to be heated by referring to the object-to-be-heated sound database through communication with the external server 7000.

As another example, the external server 7000 can have the object-to-be-heated sound deep neural network model that has been trained in advance to estimate the state of the object to be heated based on the sound signal which is generated as the object to be heated is heated. In this instance, the electric range 1000 can collect the sound which is generated while heating the object to be heated, and also estimate the state of the object to be heated by using the object-to-be-heated sound deep neural network model through communication with the external server 7000.

As still another example, the external server 7000 can update the object-to-be-heated sound database and the object-to-be-heated sound deep neural network model by communicating with and collecting information from various electric ranges. The external server 7000 can also transmit the updated database and deep neural network model to the electric range 1000 so that the electric range 1000 itself estimates the state of the object to be heated based on the sound signal which is generated as the object to be heated is heated.

In order to estimate the state of the object to be heated so that the object is not excessively heated, the electric range 1000 can first perform an operation of heating the object to be heated disposed on the top plate 120 of the electric range 1000, sense the sound generated by the object to be heated through the sound sensor 170, and adjust the amount of power supplied to the heating member 130 of the electric range 1000 based on the sound signal received from the sound sensor 170.

Further, the controller 200 of the electric range 1000 can determine the state of the object to be heated based on the sound signal received from the sound sensor 170. Upon this determination, the controller 200 of the electric range 1000 can estimate the state of the object to be heated according to the sound signal received from the sound sensor 170 by using the deep neural network model that has been trained in advance to estimate the state of the object to be heated based on the sound signal which is generated as the object to be heated is heated.

Further, since a different sound signal may be generated at the same degree of boiling according to the weight of the object to be heated, the controller 200 of the electric range 1000 can determine the state of the object to be heated based on the weight signal received from the weight sensor 160 for sensing the weight of the object to be heated supported by the top plate 120 and the sound signal received from the sound sensor 170, when adjusting the amount of power supplied to the heating member 130.

Figure 5:
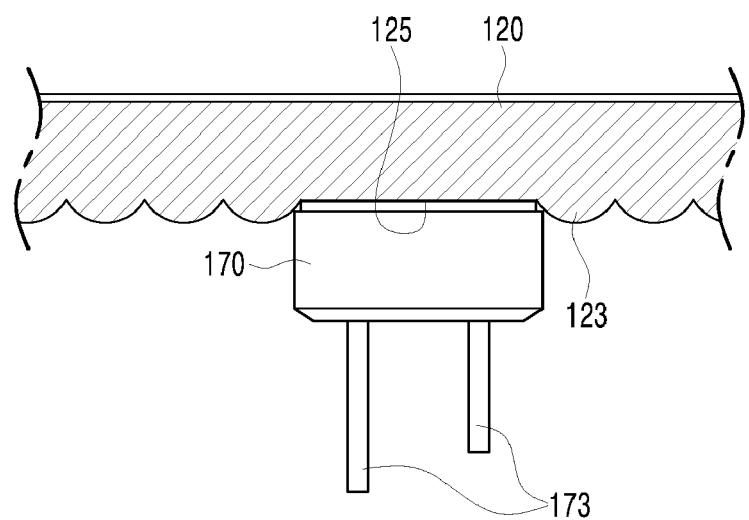
FIG. 5 is a diagram illustrating a position where a sound sensor is disposed in the heating apparatus according to an embodiment of the present disclosure.

Next, FIG. 5 is a diagram illustrating the position where the sound sensor is disposed in the heating apparatus according to an embodiment of the present disclosure. As shown in FIG. 5, the bottom surface of the top plate 120 of the electric range 1000 can be processed to have an embossed shape 123. The embossed shape 123 is intended to disperse the pressure transferred downwards when the top plate 120 is pressed while supporting a heavy object to be heated.

However, in order for the sound sensor 170 to sensitively sense the sound transferred through the top plate 120, it is preferable for the sound sensor 170 to contact the top plate 120 with as large an area as possible. Accordingly, a portion of the bottom surface of the top plate 120 that contacts the sound sensor 170 can be formed to have a flat shape 125 through a grinding process, for example.

Accordingly, the sound sensor 170 can sensitively sense the sound generated by the object to be heated transferred through the top plate 120, and accordingly, the controller 200 can more accurately confirm the state of the object to be heated. In addition, the sound sensor 170 may include a portion for sensing sound and a connector 173 for transferring the sensed sound as an electrical signal.

In addition, the connector of the sound sensor 170 can be connected to a PCB or the like disposed inside the housing 110, and accordingly, a sound signal can be transferred to the controller 200. Further, the controller 200 can send an alarm signal to the user terminal 5000 or the artificial intelligence speaker 3000 through the transceiver 220, when it is determined, based on the sound signal received from the sound sensor 170, that the object to be heated is boiling.

Since the user who receives the alarm signal through the user terminal 5000 or the artificial intelligence speaker 3000 recognizes that the food that he/she is cooking is boiling, it is possible to prevent a dangerous situation, which is caused by neglect, from occurring. In addition, the user can be informed of the situation occurring in the electric range 1000 through the user terminal 5000 even while at a remote location, and accordingly may remotely confirm and control the operation of the electric range 1000.

Figure 6:
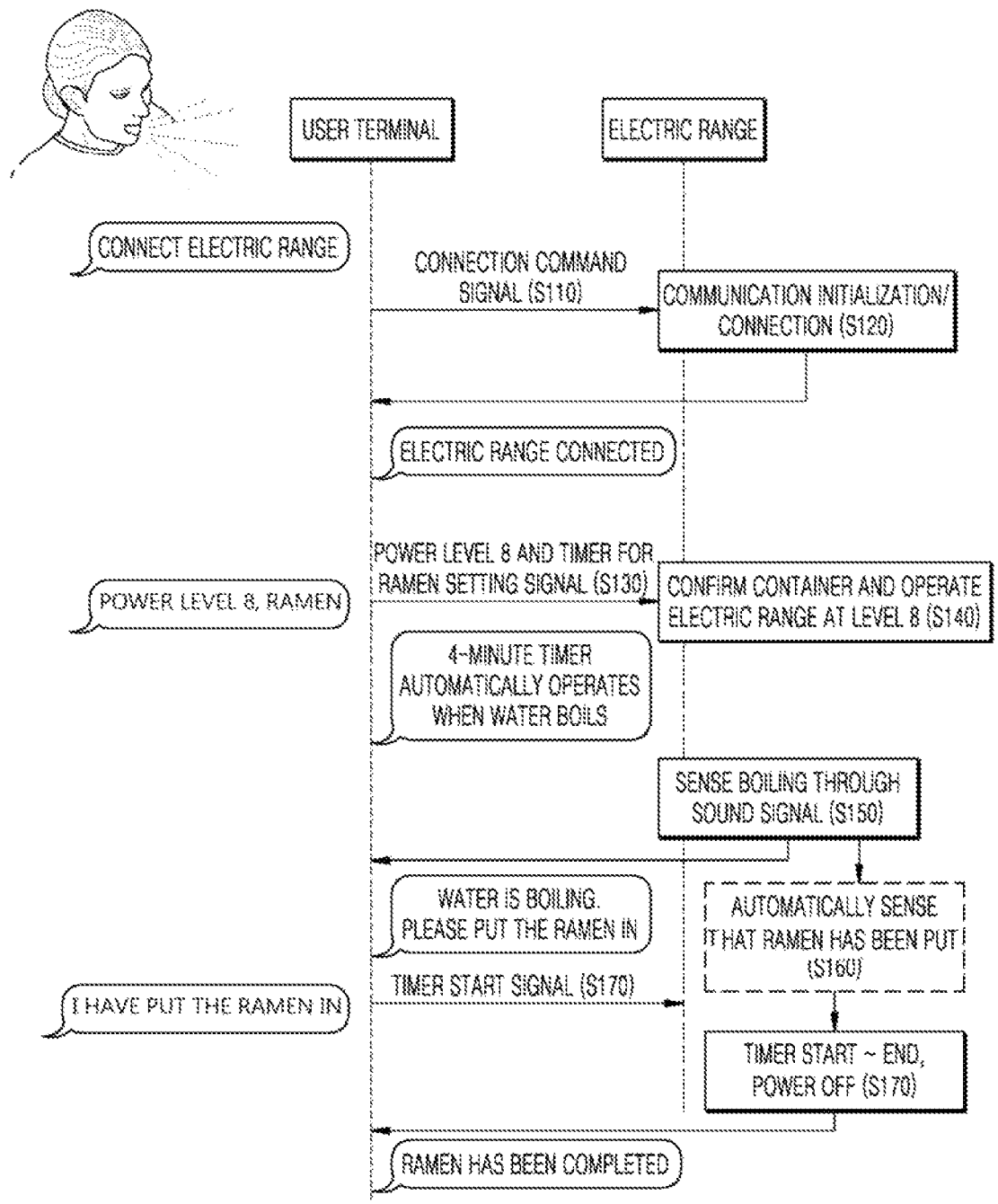
FIG. 6 is a flowchart illustrating an operation of a heating apparatus according to another embodiment of the present disclosure.

Next, FIG. 6 is a flowchart illustrating an operation of a heating apparatus according to another embodiment of the present disclosure. In particular, FIG. 6 illustrates when the user tries to boil ramen by using the electric range 1000. The user can first make a voice command such as "Connect the electric range" to the user terminal 5000, so that the electric range 1000 is connected to the user terminal 5000. According to this voice command, the user terminal 5000 sends a connection command signal to the electric range 1000 (S110).

The electric range 1000, having received the connection command signal, performs communication initialization and connection with the user terminal 5000 (S120). The user terminal 5000, having received a connection confirmation signal, can perform a voice report of "The electric range has been connected" to the user. The user who has confirmed that the user terminal 5000 and the electric range 1000 have been connected can say "Power level 8, ramen," corresponding to the cooking that he or she is planning, thereby expressing the intention to boil water for cooking ramen at a power level 8.

Accordingly, the user terminal 5000 can send, to the electric range 1000, a signal that sets the power level to 8 and sets a timer for the ramen (a timer set to boil water for a further 4 minutes after the water initially boils, or a timer set to boil the water for a further 4 minutes after the ramen has been added by, after the water initially boils, sensing when the ramen is added via the weight sensor) (S130). While sending the signal, the user terminal 5000 can notify the user of the details of the timer to be set by outputting, by voice, "When the water boils, a 4-minute timer will be automatically set."

When receiving the signal, the electric range 1000 can start an operation at power level 8 after confirming, through the weight sensor, whether the container containing the object to be heated has been placed on the top plate 120 (S140). While heating water by supplying power to the heating member 130, the electric range 1000 can sense that the water is boiling by receiving the sound signal in the above-described manner, and inform the user terminal 5000 that the water is boiling (S150).

When the user terminal 5000 receives a signal indicating that the water is boiling (a boiling signal), the user terminal 5000 can inform the user that "The water is boiling. Please put in the ramen." In response thereto, the user can inform the user terminal 5000 that he or she has put in the ramen by voice, by saying "I have put in the ramen." Accordingly, the user terminal 5000 can send a timer start signal to the electric range 1000 (S170).

As another example, even if the user puts in the ramen without any signal, the weight sensor of the electric range 1000 can automatically sense that the ramen has been put in (S160). In response to this sensing, the electric range 1000 can ask the user for confirmation, or start the timer without asking for confirmation.

Since the electric range 1000 has already received information about the cooking of the ramen from the user, the electric range 1000 can set the timer to operate for 4 minutes from the time point when the ramen was put in. After boiling the water for a further 4 minutes, the electric range 1000 can stop the heating operation (S170). When a signal indicating that the heating operation has been stopped is transferred to the user terminal 5000, the user terminal 5000 can inform the user that the cooking has been completed by saying "The ramen is ready."

Figure 7:
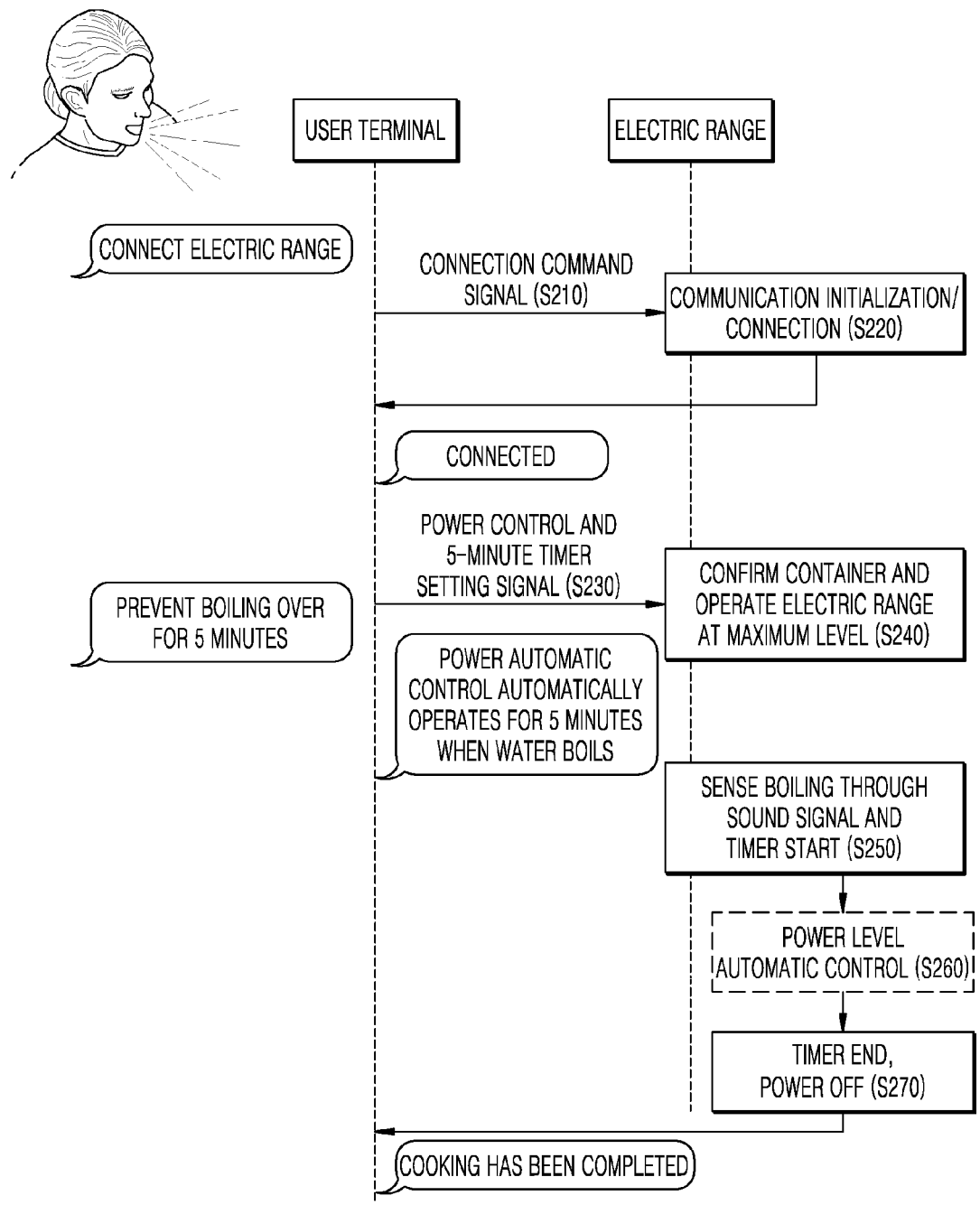
FIG. 7 is a flowchart illustrating an operation of a heating apparatus according to still another embodiment of the present disclosure.

Next, FIG. 7 is a flowchart illustrating an operation of a heating apparatus according to still another embodiment of the present disclosure. In particular, FIG. 7 illustrates when the user desires to boil a specific food by using the electric range 1000, and then maintain the temperature for 5 minutes while preventing boiling over. As shown, the user can first make a voice command such as "Connect the electric range" to the user terminal 5000, so that the electric range 1000 is connected to the user terminal 5000. According to this voice command, the user terminal 5000 sends a connection command signal to the electric range 1000 (S210).

The electric range 1000, having received the connection command signal, performs communication initialization and connection with the user terminal 5000 (S220). The user terminal 5000, having received the connection confirmation signal, can perform a voice report of "Connected" to the user. The user who has confirmed that the user terminal 5000 and the electric range 1000 have been connected can say "Prevent boiling over for 5 minutes" regarding the cooking that he or she is planning, thereby expressing the intention to boil the water and have the water boil for a further 5 minutes after the water initially starts to boil while preventing boiling over.

Accordingly, the user terminal 5000 can send, to the electric range 1000, a signal that sets power for boiling the object to be heated and sets a 5-minute timer (a timer set to boil the object to be heated for a further 5 minutes after initially starting to boil) (S230). While sending the signal, the user terminal 5000 can notify the user of the details of the timer to be set by outputting, by voice, "When the water boils, automatic power control will automatically operate for 5 minutes."

When receiving the signal, the electric range 1000 can confirm, through the weight sensor, whether the container containing the object to be heated has been placed on the top plate 120, and then start an operation at the maximum power level (S240). While heating the object to be heated by supplying power to the heating member 130, the electric range 1000 can sense that the object to be heated is boiling by receiving the sound signal in the above-described manner, and start the 5-minute timer (S250).

The electric range 1000 can maintain the temperature of the object to be heated for 5 minutes while the object to be heated is prevented from boiling over by the automatic power level control (S260). The electric range 1000 can perform the automatic power level control for 5 minutes from the time point at which water initially started to boil, and then stop the heating (S270).

Further, the user terminal 5000 can receive notification of the fact that the heating has been stopped, and inform the user that the cooking has been completed by voice, such as "The cooking has been completed."

Figure 8:
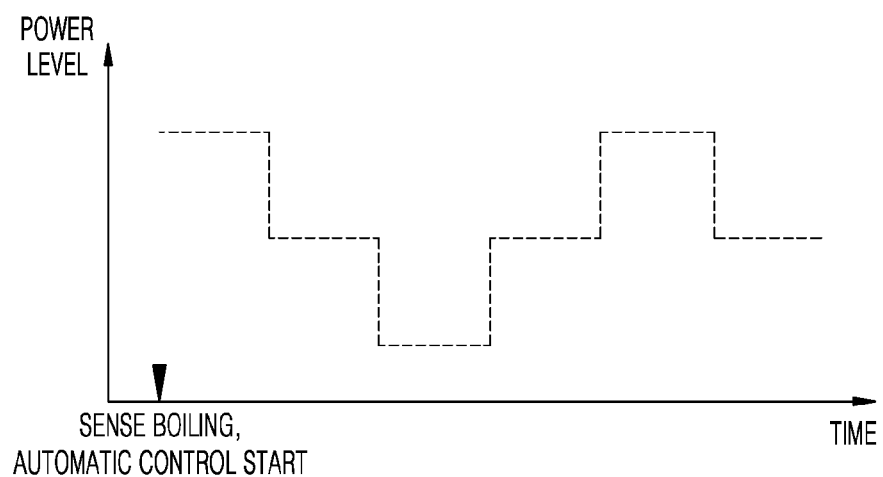
FIG. 8 is a diagram illustrating an operation of automatically controlling power after sensing the boiling state of the object to be heated in the heating apparatus according to an embodiment of the present disclosure.

Next, FIG. 8 is a diagram illustrating an automatic power level control, which is an operation for automatically controlling power after sensing a boiling state of the object to be heated in the heating apparatus according to an embodiment of the present disclosure. The controller 200 of the electric range 1000 can start the automatic power control from the time point when it is sensed that the object to be heated is boiling, and can control the power level supplied to the heating member 130 in the manner shown in FIG. 8.

The time point when the power level is changed corresponds to a time point when there is a change in the sound signal, and the controller 200 can increase or reduce the power level such that the magnitude of the sound signal received from the sound sensor is maintained within a certain range during a target time set by the user. After the target time set by the user has elapsed, the controller 200 can reduce the power level supplied to the heating member 130, or bring the power level to zero.

Figure 9:
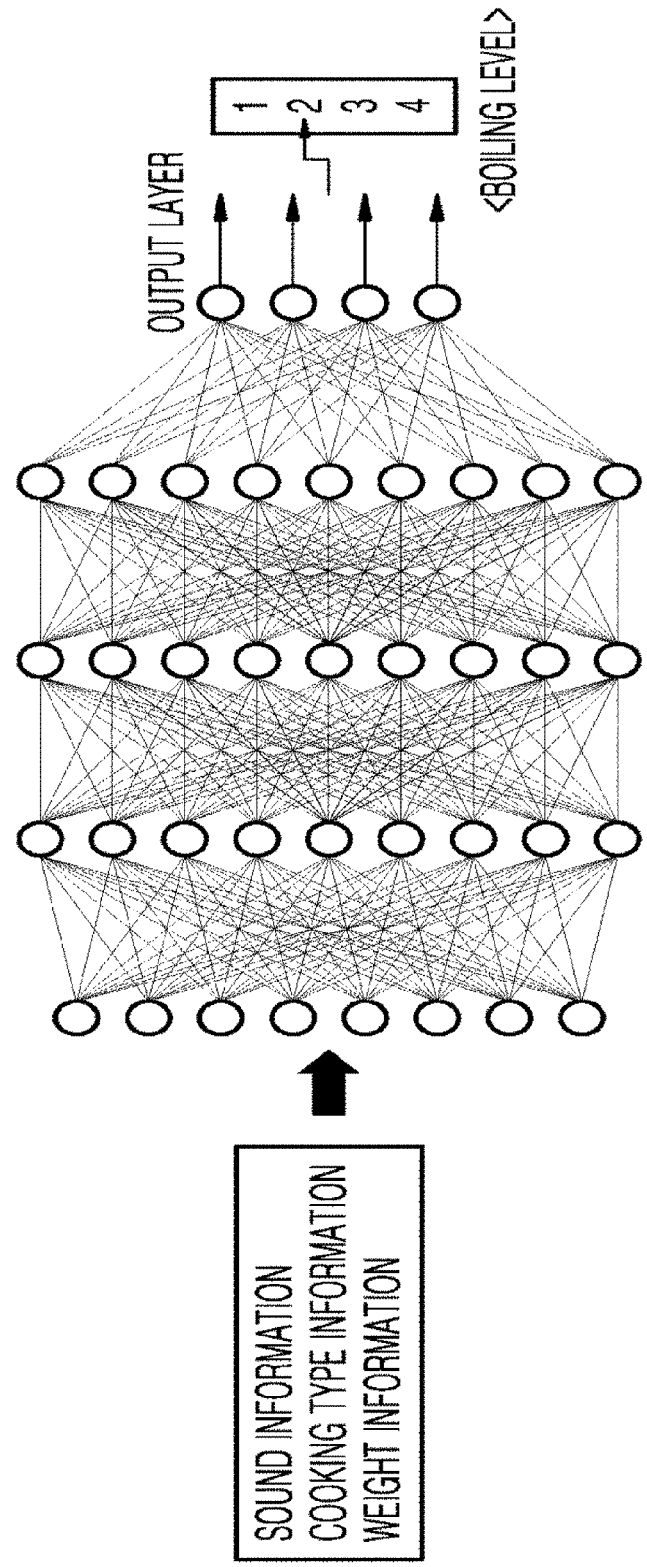
FIG. 9 is a diagram illustrating a deep neural network model for predicting the state of the object to be heated used in the heating apparatus according to an embodiment of the present disclosure.

FIG. 9 is a diagram illustrating a deep neural network model for predicting a state of the object to be heated used in the heating apparatus according to an embodiment of the present disclosure. The electric range 1000 can also use a deep neural network model that has been trained in advance using machine learning, which is an area of artificial intelligence, to estimate the state of the object to be heated through the sound signal.

Here, artificial intelligence (AI) is an area of computer engineering science and information technology that studies methods to make computers mimic intelligent human behaviors such as reasoning, learning, self-improving, and the like. Further, artificial intelligence does not exist on its own, but is rather directly or indirectly related to a number of other fields in computer science. Particularly, in recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance based on experiential data. Machine learning algorithms, rather than only executing rigidly set static program commands, may be used to take an approach that builds models for deriving predictions and decisions from input data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction. Bayesian network may include a model that represents the probabilistic relationship (conditional independence) among a set of variables. Bayesian network may be appropriate for data mining through unsupervised learning.

SVM may include a supervised learning model for pattern detection and data analysis, heavily used in classification and regression analysis. ANN is a data processing system modeled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science. ANNs may refer generally to models that have artificial neurons (nodes) forming a network through synaptic interconnections, and acquires problem-solving capability as the strengths of synaptic interconnections are adjusted throughout training. The terms 'artificial neural network' and 'neural network' may be used interchangeably herein.

An ANN may include a number of layers, each including a number of neurons. Furthermore, the ANN may include synapses that connect the neurons to one another. An ANN may be defined by the following three factors: (1) a connection pattern between neurons on different layers; (2) a learning process that updates synaptic weights; and (3) an activation function generating an output value from a weighted sum of inputs received from a previous layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN). An ANN may be classified as a single-layer neural network or a multi-layer neural network, based on the number of layers therein.

An ANN may be classified as a single-layer neural network or a multi-layer neural network, based on the number of layers therein. In general, a single-layer neural network may include an input layer and an output layer. In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron may be activated and output an output value obtained through an activation function.

A deep neural network with a plurality of hidden layers between the input layer and the output layer may be the most representative type of artificial neural network which enables deep learning, which is one machine learning technique. An ANN may be trained using training data. Here, the training may refer to the process of determining parameters of the artificial neural network by using the training data, to perform tasks such as classification, regression analysis, and clustering of input data. Such parameters of the artificial neural network may include synaptic weights and biases applied to neurons. An artificial neural network trained using training data may classify or cluster input data according to a pattern within the input data.

Throughout the present specification, an artificial neural network trained using training data may be referred to as a trained model. Hereinbelow, learning paradigms of an artificial neural network will be described in detail.

Learning paradigms, in which an artificial neural network operates, may be classified into supervised learning, unsupervised learning, semi-supervised learning, and reinforcement learning. Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier. In supervised learning, an artificial neural network may be trained with training data that has been given a label. Here, the label may refer to a target answer (or a result value) to be guessed by the artificial neural network when the training data is input to the artificial neural network.

Throughout the present specification, the target answer (or a result value) to be guessed by the artificial neural network when the training data is input may be referred to as a label or labeling data. Throughout the present specification, assigning one or more labels to training data in order to train an artificial neural network may be referred to as labeling the training data with labeling data.

Training data and labels corresponding to the training data together may form a single training set, and as such, they may be input to an artificial neural network as a training set. The training data may exhibit a number of features, and the training data being labeled with the labels may be interpreted as the features exhibited by the training data being labeled with the labels. In this instance, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label. More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis. Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other. The generator may be a model generating new data that generates new data based on true data.

The discriminator may be a model recognizing patterns in data that determines whether input data is from the true data or from the new data generated by the generator. Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output. More specifically, AE may include an input layer, at least one hidden layer, and an output layer. Since the number of nodes in the hidden layer is smaller than the number of nodes in the input layer, the dimensionality of data is reduced, thus leading to data compression or encoding.

Furthermore, the data output from the hidden layer may be input to the output layer. Given that the number of nodes in the output layer is greater than the number of nodes in the hidden layer, the dimensionality of the data increases, thus leading to data decompression or decoding.

Furthermore, in the AE, the input data is represented as hidden layer data as interneuron connection strengths are adjusted through training. The fact that when representing information, the hidden layer can reconstruct the input data as output by using fewer neurons than the input layer may indicate that the hidden layer has discovered a hidden pattern in the input data and is using the discovered hidden pattern to represent the information.

Semi-supervised learning is machine learning method that makes use of both labeled training data and unlabeled training data. This technique may be used advantageously when the cost associated with the labeling process is high.

Reinforcement learning may be based on a theory that given the condition under which a reinforcement learning agent may determine what action to choose at each time instance, the agent may find an optimal path to a solution solely based on experience without reference to data. Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

Also, the hyperparameters are set before learning, and model parameters may be set through learning to specify the architecture of the artificial neural network. For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning. For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function. Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value. In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function. The direction in which the model parameters are to be adjusted may be referred to as a step direction, and a size by which the model parameters are to be adjusted may be referred to as a step size. Here, the step size may mean a learning rate.

GD obtains a slope of the cost function through use of partial differential equations, using each of model parameters, and updates the model parameters by adjusting the model parameters by a learning rate in the direction of the slope. SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Accordingly, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters may be set to optimal values that provide a stable learning rate and accuracy. It is possible to further refine the estimation of the state of the object to be heated by using the above-described methods.

Although there may be various methods for generating the deep neural network model to be used in an embodiment of the present disclosure, in the case of supervised learning, the following training process may be performed as preliminary work. After installing an apparatus capable of directly measuring the temperature of the contents of a pot and a microphone capable of collecting the sound generated from the pot on the top plate of the electric range, the temperature of the contents and the sound generated at the corresponding temperature may be recorded while changing, for example, the type, weight, and size of the pot, and the type, weight, and size of contents contained in the pot.

The recorded data is sound data for which the corresponding temperature is labeled, and the deep neural network model may learn using the labeled data. Specifically, a deep neural network model capable of estimating the temperature of the contents according to the sound generated from the pot on the top plate of the electric range may be trained with the labeled data.

The deep neural network model generated through this preliminary work may be embedded in the memory of the electric range 1000, or stored in the external server 7000 with which the electric range 1000 communicates, and may be used to estimate the state of the object to be heated according to the sound signal received from the sound sensor 170 of the electric range 1000 during actual use.

Information such as sound information collected by the electric range 1000 from the object to be heated which is being heated, information of the type of cooking input by the user, and weight information sensed by the weight sensor 160 may be input to the deep neural network model that is trained as described above, and accordingly, the current state of the object to be heated or an estimation result relating to the degree of boiling of the object to be heated may be output.

Meanwhile, the input information may include various information such as the material of the container, the shape of the container, and the type of contents, in addition to the information described in FIG. 9. In this instance, it is natural that a deep neural network model suitable for such input information may be trained and used.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Accordingly, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method of controlling a heating apparatus, the method comprising:
supplying power to a heating member of the heating apparatus to heat an object;
detecting, via a sound sensor disposed under a top plate of the heating apparatus, a sound signal generated between a pot and the top plate while the pot vibrates as the object to be heated is heated by the heating member;
detecting, via a weight sensor disposed to contact a bottom surface of the top plate, a weight of the object to be heated that is supported by the top plate;
obtaining recorded data by recording the temperature of the object and the sound signal generated at the corresponding temperature while changing a type, a weight, and a size of the pot, and a type, the weight, and a size of the object contained in the pot;
making labeled data by labelling the recorded data as the corresponding temperature;
learning a deep neural network model to estimate a state of the object to be heated according to input information;
determining, via an artificial intelligence model having learned properties of the sound signal, whether the object to be heated is boiling; and
adjusting the power supplied to the heating member based on the determination of whether the object to be heated is boiling.

2. The method of claim 1, wherein:
at least a portion of a bottom surface of the top plate has an embossed shape,
the sound sensor is disposed to contact the bottom surface of the top plate, and
at least a portion of the bottom surface of the top plate on which the sound sensor is disposed has a flat shape so that the sound sensor closely contacts the bottom surface of the top plate.

3. The method of claim 2, further comprising:
determining if the object to be heated is boiling by using a deep neural network model that has been trained in advance to determine if the object to be heated is boiling based on the sound signal detected by the sound sensor.

4. The method of claim 1, further comprising:
communicating, via a transceiver included in the heating apparatus, with a terminal; and
transmitting an alarm signal to the terminal through the transceiver when the object to be heated is determined to be boiling.

5. The method of claim 1, further comprising:
determining an additional cooking ingredient has been added or removed to the object based on the weight sensed by the weight sensor.

6. The method of claim 1, further comprising:
sensing, via the weight sensor disposed to contact a bottom surface of the top plate, a weight of the object to be heated that is supported by the top plate;
if no additional weight change is sensed after a predetermined time period, reducing power supplied to the heating member;
if an increased weight change is sensed during the predetermined time period, maintaining the power supplied to the heating member or increasing the power supplied to the heating member;
if a reduced weight change is sensed after the predetermined time period, reducing the power supplied to the heater member including turning off the power and stop detecting the sound signal;
if a reduced weight between a first weight and a second weight is sensed, reducing the power supplied to the heating member by a first amount, and if a reduced weight between the second weight and a third weight is then sensed, reducing the power supplied to the heating member by a second amount; and
if an increased weight is sensed between the first weight and the second weight, increasing the power to the heating member to maintain a boiling state of the object to be heated.

7. The method of claim 1, wherein the heating member is disposed to contact a bottom surface of the top plate,
wherein the heating member includes a coil having a hollow formed in the center thereof, and
wherein the vibration sensor is disposed to contact the bottom surface of the top plate at a position where the hollow is formed.

8. The method of claim 4, further comprising:
receiving, via the transceiver, from the terminal, information on a target time during which boiling is to be maintained;
controlling the power supplied to the heating member such that a magnitude of the sound signal of the sound detected by the sound sensor is maintained within a certain range during the target time from a time point at which the object is determined to be boiling; and
reducing the power supplied to the heating member after the target time has elapsed.

* * * * *